UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

957,039.  Specification of Letters Patent.  Patented May 3, 1910.

No Drawing. Application filed May 15, 1909, Serial No. 496,111. Renewed March 18, 1910. Serial No. 550,294.

*To all whom it may concern:*

Be it known that I, JOSEPH DEINET, a citizen of the German Empire, residing at Elberfeld, Germany, have invented new and useful Improvements in New Vat Dyes, of which the following is a specification.

My invention relates to the production of a new anthracene derivative. It is obtained by converting 1-amino-4-methoxyanthraquinone into its monobenzoylated derivative. The reaction is carried out by treating 1-amino-4-methoxyanthraquinone with benzoyl chlorid.

Example: 10 parts of 1-amino-4-methoxyanthraquinone are heated to 100° C. for about half an hour with 100 parts of nitrobenzene and 20 parts of benzoyl chlorid. The new condensation product crystallizes from the cooling liquid in the shape of orange red needles which are filtered off and dried. It is soluble in pyridin with a yellow color, in concentrated sulfuric acid with a brown color. By treatment with hydrosulfite and NaOH an orange vat is obtained which dyes cotton, wool or silk ponceau-red shades.

I claim:

The herein described new vat dyestuff of the anthracene series which is the 1-benzoylamino-4-methoxyanthraquinone, which dyestuff is, after being dried and pulverized, an orange red powder which is soluble in pryridin with a yellow color; soluble in concentrated sulfuric acid with a brown color; giving an orange vat with hydrosulfite and caustic soda lye, which vat dyes the textile fiber beautiful ponceau-red shades, substantially as described.

In testimony whereof I have hereunto set my hand in the presence of two subscribing witnesses.

JOSEPH DEINET. [L. S.]

Witnesses:
OTTO KÖNIG,
C. J. WRIGHT.